US00RE34055E

United States Patent [19]

Tassicker

[11] E Patent Number: Re. 34,055

[45] Reissued Date of Patent: Sep. 8, 1992

[54] VERTICALLY TIERED PARTICLE FILTERING APPARATUS

[75] Inventor: Owen J. Tassicker, Cupertino, Calif.

[73] Assignee: Electric Power Research Institute, Inc., Palo Alto, Calif.

[21] Appl. No.: 701,474

[22] Filed: May 16, 1991

Related U.S. Patent Documents

Reissue of:

[64] Patent No.: 4,525,184
Issued: Jun. 25, 1985
Appl. No.: 496,520
Filed: May 20, 1983

[51] Int. Cl.[5] ..... B01D 46/02; B01D 29/62

[52] U.S. Cl. ..... 55/302; 55/324; 55/341.1; 55/350; 55/484; 55/485

[58] Field of Search ..... 55/293, 300, 302, 304, 55/305, 324, 341.1, 341.5, 341.6, 350, 484, 485; 210/323.2, 333.01, 345, 347

[56] References Cited

U.S. PATENT DOCUMENTS

| | | | |
|---|---|---|---|
| 655,841 | 8/1900 | Watson et al. | 210/345 |
| 1,000,405 | 8/1911 | Healy | 55/485 X |
| 2,317,449 | 4/1943 | Flock | 210/345 X |
| 2,374,976 | 5/1945 | Briggs et al. | 210/345 |
| 2,523,793 | 9/1950 | Vance | 210/323.2 X |
| 3,491,518 | 1/1970 | Williams | 55/302 X |
| 3,986,960 | 10/1976 | Wire et al. | 210/323.2 X |
| 4,226,723 | 10/1980 | Furchas | 55/484 X |
| 4,264,345 | 4/1981 | Miller | 55/302 X |
| 4,283,282 | 8/1981 | Saint-Dizier et al. | 210/323.2 X |
| 4,289,630 | 9/1981 | Schmidt, Jr. et al. | 55/300 X |

FOREIGN PATENT DOCUMENTS

| | | | |
|---|---|---|---|
| 578549 | 6/1959 | Canada | 210/323.2 |

*Primary Examiner*—Robert Spitzer
*Attorney, Agent, or Firm*—Flehr, Hohbach, Test, Albritton & Herbert

[57] ABSTRACT

An apparatus especially suitable for filtering out a particulate material from a carrier fluid such as flue gases is disclosed herein. This assembly utilizes a main vessel defining an interior compartment and having an inlet and separate outlet. A number of filter assemblies are disposed within the vessel compartment and supported therein in spaced relationship with one another and with the vessel itself by means of a single tubular member which also serves as a discharge pipe between the filter assemblies and the vessel's outlet.

24 Claims, 3 Drawing Sheets

VERTICALLY TIERED PARTICLE FILTERING APPARATUS

Matter enclosed in heavy brackets [ ] appears in the original patent but forms no part of this reissue specification; matter printed in italics indicates the additions made by reissue.

The present invention relates generally to filtering apparatus and more particularly to a specifically designed apparatus including a number of separate vertically tiered filter assemblies especially suitable for filtering out particulate material from carrier fluid such as flue gases produced by combustion or other such processes.

One method of separating particulate material from flue gases produced by combustion and other such processes utilizes porous filter elements which may comprise a multiplicity of filter tubes supported in parallel relationship to one another by a common support plate or tube sheet as it is often called. The flue gases are generally quite hot, for example 150° C., and are typically at atmospheric pressure. Under these conditions, the filter tubes are typically made of polyester, acrylic or glass. For pressurized fluid bed combustion (PFBC) the resultant gases can be as high as 900° C. at gas pressures from 5 to 15 times atmospheric pressure, in which case the filter tubes are constructed of porous ceramic or rigid sintered porous stainless steel. The particles to be captured by the different tubes vary in size from 0.2 microns to 20 microns and can weigh in total up to 10 parts per thousand of the weight of gas or more. When the deposit of dust on a filter element increases to 2 or 3 mm, the pressure drop steadily rises and the elements must be cleaned by shaking the tubes, by reversing gas flow or by means of applying high pressure gas pulses through the filter tubes. It is desirable to achieve an overall particle collection efficiency of at least 99% which is required to meet certain EPA performance standards and for protecting gas-turbine blades from erosion and deposition in combined cycle thermal systems when the filtering method is used to clean the gases entering such systems.

A general difficulty in the design of any industrial filter assembly comprising a multiplicity of small individual filter tubes of the type recited above is to properly and conveniently assemble such elements in a single vessel. Such a vessel may be required to contain many hundreds of tubes and the particulate laden fluid (which may be a gas or a liquid) must enter the vessel in such a way as to be well distributed around the individual filter tubes. Moreover, each filter tube must be cleaned in any one of the ways mentioned above or in any other suitable way and the particulate material cleaned from these tubes must be collected and eventually removed from the vessel. The filtered fluid must then be ducted from the vessel at a convenient location. All of these requirements impose many mechanical, thermal and aerodynamic constraints in the design and construction of the overall filtering apparatus.

Heretofore, a typical apparatus utilizing filtering tubes included a main vessel containing a single plate or tube sheet for supporting the filter tubes in a vertically depending manner. This particular type of apparatus has a number of drawbacks. In the first place, the only way that its filter area can be enlarged is by extending its tube sheet diameter in order to support more filter tubes. This quickly leads to a practical mechanical limit. Because the tube sheet is generally supported only at its circumferential edge, it tends to sag at its center as a result of increasing weight, or it must be made sufficiently thick to prevent sagging which eventually becomes economically prohibitive. Even advanced alloy tube sheets do not overcome this problem at high temperatures. To solve this problem by providing center supports is also impractical because of problems associated with the differential expansion and contraction due to the relatively high temperatures. Even if this problem could be solved, assuming it would be economically justifiable to do so, there are other drawbacks associated with increasing the size of the tube sheet to accommodate a larger number of filter tubes. For example, as the tube sheet increases in size, the overall apparatus becomes squat in shape and eventually unsuitable for barge, rail or road transportation. Also, as the tube sheet increases in size, the containment vessel itself must be enlarged not only in diameter but also in thickness in order to contain and support the tube sheet and internal pressure. Obviously, providing a sufficiently large vessel can be quite expensive and, again, economically prohibitive.

While it may be possible to increase filtering capacity of an apparatus of the type just described by increasing the lengths of its filtering tubes, this is, of course, self-limiting also. Moreover, some rather attractive new advanced ceramic filter tubes have become available but cannot be made any longer than about 1.5 meters. Thus, in order to expand the filtering capacity of the apparatus of the type described above, utilizing these particular filter tubes would require extending the tube sheet diameter and therefore result in the problems just discussed.

In view of the foregoing, it is one object of the present invention to provide a particle filtering apparatus capable of functioning in the manner discussed above, but without the problems associated with the apparatus just described.

Another object of the present invention is to overcome the problem of the prior art in an uncomplicated, economical and yet reliable manner.

As will be seen hereinafter, the particular apparatus disclosed herein is especially suitable for filtering out particulate material of a predetermined minimum size from flue gases produced by combustion or other such processes in a relatively hot and even pressurized environment. This apparatus utilizes a main containment vessel defining an interior compartment having inlet means through which the particulate laden flue gases (or other such carrier fluid being filtered) can pass in order to enter the compartment. The vessel also includes separate outlet means through which the carrier fluid, once filtered, can pass in order to leave the compartment. A plurality of filter assemblies are disposed within the vessel compartment and are supported in spaced apart relationship with one another and with the containment vessel itself by means of a single support tube also disposed within the vessel compartment. This tube which preferably extends in a vertical direction serves as a sole means for supporting the filter assemblies, and, at the same time, cooperates with these assemblies and the vessel's outlet means in order to serve as a discharge pipe for directing the filtered fluid out of the vessel through its outlet means.

In a preferred embodiment of the present invention, the discharge tube just recited is supported within the containment vessel in a vertical direction and the various filter assemblies are located in vertically spaced relationship to one another along the length of the tube so as to present a tiered configuration. In this way, each filter assembly can have its own relatively small tube sheet while the overall filtering capacity of the apparatus can be increased merely by increasing the length of the discharge tube and the number of filter assemblies supported thereto. While this increases the height of the containment vessel, the wall thickness of the vessel does not have to increase because the hoop stress due to internal pressure is a constant. Also, because the overall vessel does not increase horizontally as the apparatus increases in filtering capacity, it maybe suitably designed for barge, rail or road transportation. Further, because the filtering capacity can be increased, by expansion vertically rather than horizontally, the relatively short but advanced ceramic filter tubes discussed previously can be used without compromising capacity.

The apparatus disclosed herein will be described in more detail hereinafter in conjunction with the drawings, wherein.

Figure 1:
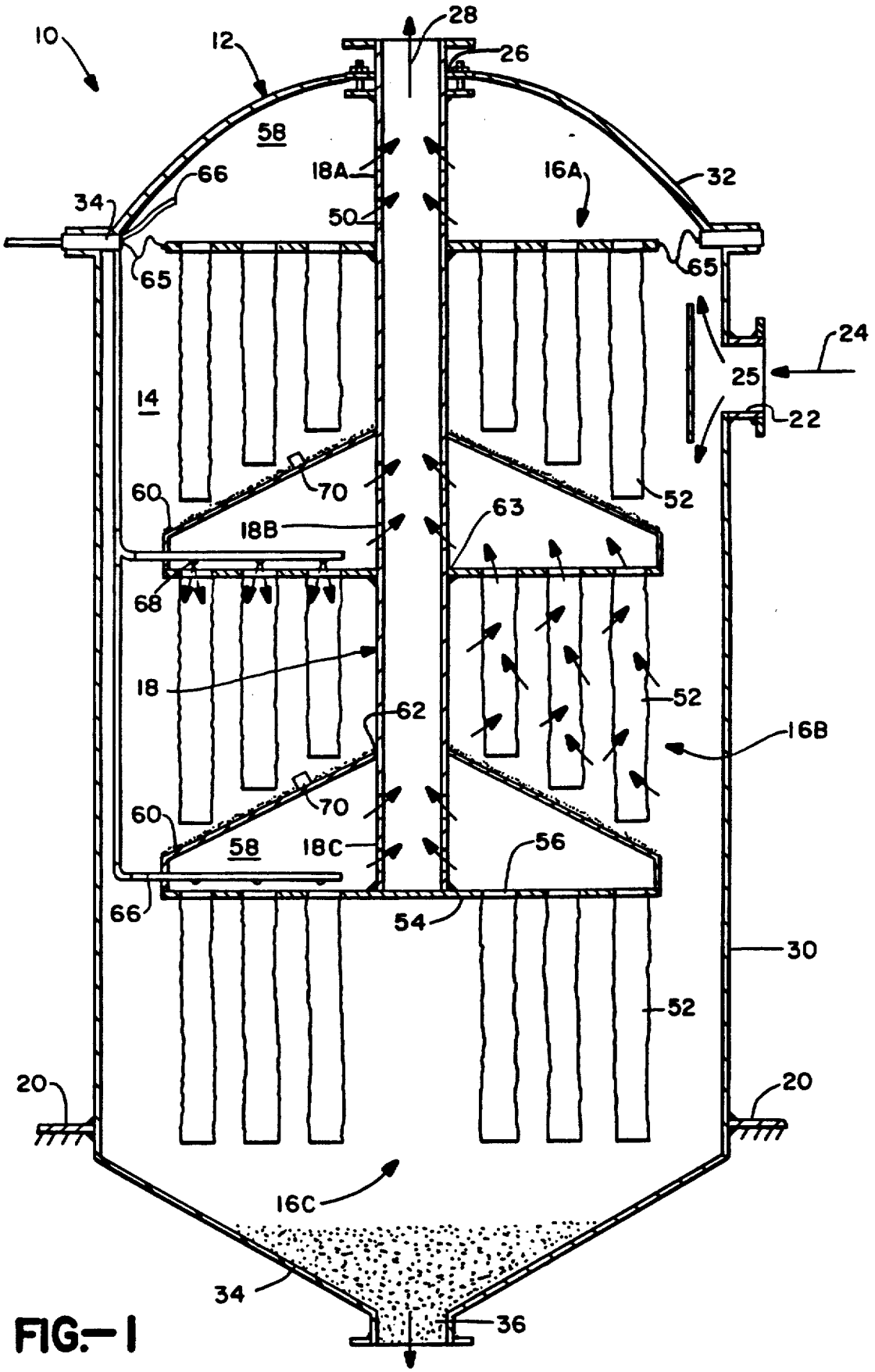
FIG. 1 is a sectional elevation illustrating one embodiment of the filtering apparatus in accordance with the present invention.

Turning now to the drawings wherein like components are designated by like reference numerals throughout the various figures, an apparatus for filtering out particulate material of a predetermined minimum size from flue gases produced by combustion or other such processes is illustrated and generally designated by the reference numeral 10. This apparatus is comprised of a main containment vessel 12 defining an interior compartment 14, three filter assemblies 16a, 16b and 16c located within compartment 14 and a single tube 18 for supporting the filter assemblies 16 in a tiered fashion, that is, in vertically spaced relationship to one another. As will be seen in more detail hereinafter, tube 18 serves as the sole or substantially the sole means for supporting the filter assemblies and, at the same time, serves as a discharge pipe for filtered flue gases.

As illustrated in FIG. 1, vessel 12 is supported in a vertically extending position by suitable support means generally indicated at 20 and includes an inlet 22 through which particulate laden flue gases generally indicated at 24 pass in order to enter compartment 14. A deflector plate 25 may be provided across the inlet, as shown in order to prevent direct impingement of inlet gases onto filter element surfaces. The vessel provides a separate outlet 26 through which the gases generally indicated at 28 pass in order to leave the compartment once they have been cleaned of particulate matter (of a predetermined minimum size) by means of filtering assemblies 16. The inlet 22 is shown in the vertical sidewall 30 forming part of vessel 12 near the top end of the latter and the outlet 26 is shown at the very top end of the vessel, actually at the peak of a dome 32 which is removably attached to the top end of sidewall 30 in a sealed manner by suitable seal means not shown. Inlet 22 and outlet 26 are the only openings into and out of compartment 14, except for a lowermost outlet 36 forming the bottom end of a dust hopper 34 which also serves as the bottom end of the vessel. While not shown, outlet 36 is provided with means for opening and closing it in a sealed manner.

Figure 2:
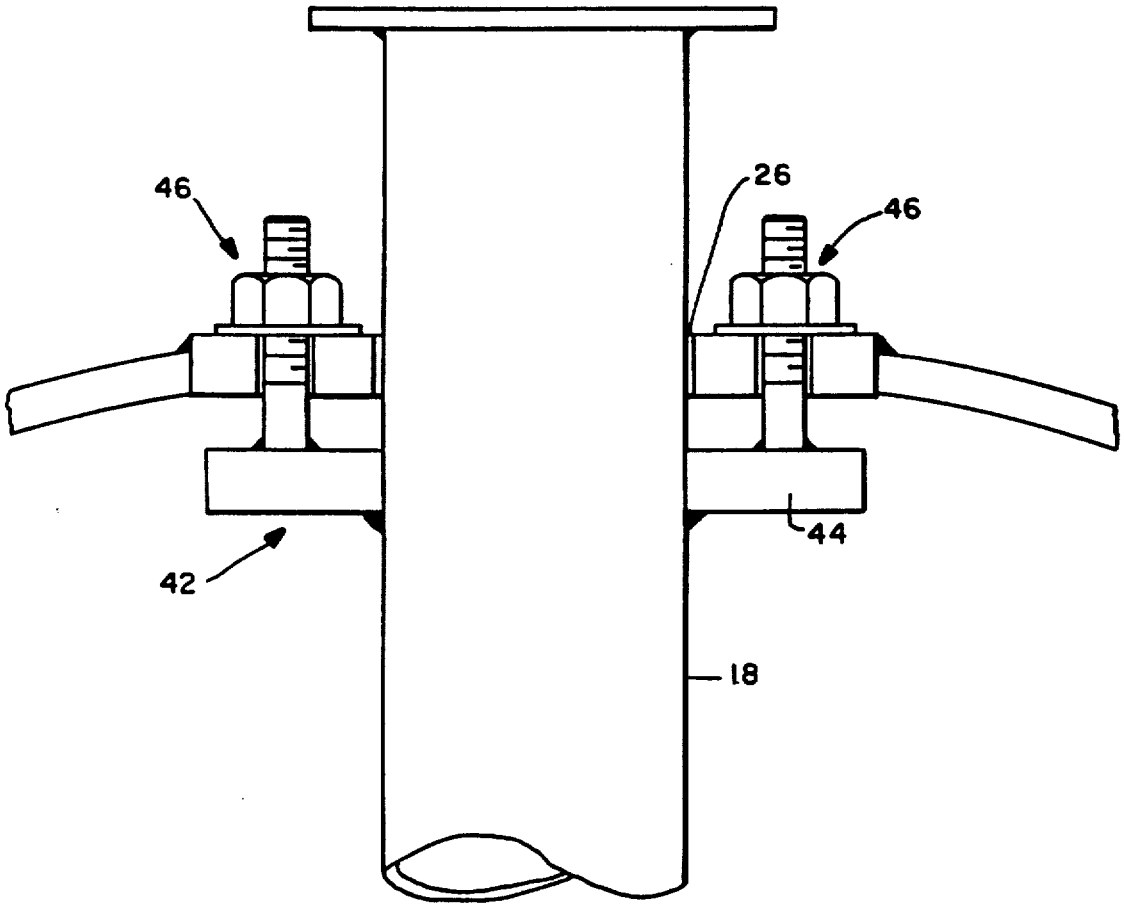
FIG. 2 is an alternative detail of an aspect of the apparatus illustrated in FIG. 1.

As stated previously, tube 18 serves both as a sole means for supporting filter assemblies 16 and also as a discharge pipe for filtered flue gases. To this end, the tube extends vertically into compartment 14 through outlet 26, stopping short of hopper 34 at its lowermost end. As best illustrated in FIG. 2, the tube is fixedly supported to dome 32 in this suspended fashion by means of support arrangement 42. This support arrangement is shown including a flange 44 welded or otherwise suitably fixedly connected to and around the tube immediately below outlet 26 and means generally indicated at 46 for bolting the flange directly to the dome. In this way, the tube is able to support filter assemblies 16 within compartment 14. Other suitable means could be provided to support the tube and assemblies 16.

In order for the tube to serve as a discharge pipe it is provided with three vertically spaced sections 18a, 18b and 18c, each of which has a series of openings 50 around its circumference. In a preferred embodiment, these openings provide as much as 20% open area in each section. At the same time, the lowermost end of the tube is closed off by suitable means. In this way, as will be seen hereinafter, flue gases filtered by means of assemblies 16, pass into the tube through openings 50 and eventually out of vessel 12 at the top end of the tube.

Turning now to filter assemblies 16, attention is first directed specifically to filter assembly 16c. As illustrated in FIG. 1, this assembly includes a plurality of readily providable filter tubes 52 which may be of similar lengths as shown or of varying lengths (see assemblies 18a and 18b). These filter tubes are supported in horizontally spaced vertically depending positions by means of an uppermost support plate (or tube sheet) 54. Accordingly, the support plate includes its own through-holes 56 and suitable means (not shown) for supporting the uppermost open ends of the filter tubes within these through-holes. At the same time, the support plate is welded or otherwise suitably fixedly mounted in a vertically extending position to the lowermost end of tube 18, thereby also serving as the means for closing the bottom end of this tube.

The bottom ends of filter tubes 52 are closed and the top ends open into a common chamber 58 defined by a hood 60 in combination with support plate 54. More specifically, hood 60 which forms part of filter assembly 16c has a bottom open end which is fixedly connected to and closed by the support plate 54. At the same time, the hood extends up from the support plate around apertured section 18c of tube 18 and may be fixedly connected thereto or it may merely rest on or be fixedly connected to the support plate. In the embodiment illustrated and in a preferred embodiment, hood 60 includes an outwardly and downwardly tapering top surface 62 which better serves to shed dust accumulating thereon, especially dust from filter assembly 16b directly above it, since this latter assembly, and in fact, all of the assemblies are periodically cleaned in place, as will be discussed hereinafter.

Having described filter assembly 16c, attention is now directed to filter assemblies 16a and 16b. This latter assembly may be identical to filter assembly 16c, with two exceptions. First, the filter tubes 52 forming part of assembly 16b may vary in length to accommodate the underlying hood 60 and, secondly, its support plate is provided with a central opening [62] *63* for accommodating the tube 18. Otherwise, assembly 16b is welded or otherwise fixedly connected to tube 18 at the lower end of tube section 18b, and the overall assembly includes its own hood 60. Filter assembly 16a may be identical to filter assembly 16b to the extent that it includes the same support plate and central opening and identical filter tubes. However, assembly 16a does not require its own hood 60 since it can use dome 32 to this end. Thus, the dome and underlying support plate together define a chamber 58 surrounding tube section 18a. A combination dust seal and expansion joint [62] *65* is provided between the outer circumference of the support plate forming part of assembly 16a and the interior surface of vessel 12 thereby sealing the chamber 58 above it and also taking into account the horizontal expansion and contraction of the support plate.

Having described overall apparatus 10 from a structural standpoint, attention is now directed to the way in which it functions to filter out particulate material of a predetermined minimum size from flue gases produced by combustion of other such processes. As stated above, particle laden gas enters the vessel from inlet 22. At the same time, the dust hopper is maintained in a closed position. The pressure of the incoming gas is sufficiently high to cause it to pass through the various filters 52 in order to escape compartment 14. In this regard, it should be noted that both of the filter assemblies 16b and 16c remain out of engagement with the containment vessel, except of course indirectly through tube 18. This is possible because the tube itself provides the sole means of support for the assemblies. As a result, the incoming flue gases may flow unobstructed to the filter tubes forming all three assemblies 16. The particle laden gas surrounding these tubes is drawn into the latter because of the differential pressure between compartment 14 and the interior of the tubes which are most likely maintained at ambient pressure through support tube 18. As the particle laden gas passes through the various filter tubes it is filtered and thereafter passes through the various hood chambers 58 and into tube 18 through openings 50 for ultimate passage out of vessel 12.

In addition to the components thus far described, overall filtering apparatus 10 may be provided with suitable means for periodically cleaning the filter tubes 52. One such means utilizes an air pump (not shown) connected with suitable conduit generally indicated at 66 having end sections with cooperating blowback nozzles 68. These end sections are shown only partially in the hood chamber 58 of filter assembly 16b. As seen there, three typical nozzles are located directly over three filter tubes 52. In actuality, sufficient conduit and the necessary number of nozzles are provided so that each tube has a nozzle directly over it. This is true for all three of the assemblies. The air pump is sufficiently strong to provide bursts of air through these nozzles for passage through the filter tubes from the inside out, thereby blowing out accumulated particulate material. Much of this particulate material from the filter assembly 16a lands on the top surface 62 of the hood forming part of assembly 16b and much of the particulate material from this latter assembly falls onto the hood of assembly 16c. Ultimately, because of the tapered shapes of these hoods and/or because each is or may be provided with suitable vibrating means generally indicated at 70, all of this accumulated particulate material falls to the bottom of hopper [38] *34* in the form of dust. At periodic intervals, outlet 36 is opened and the accumulated dust is removed from the hopper.

From the foregoing, it should be readily apparent that the filtering capacity of overall apparatus 10 can be enlarged merely by extending the containment vessel 12 and tube 18 vertically and by hanging additional filter assemblies from the tube. Regardless of the number of filter assemblies provided, within reason of course, the wall thickness of the vessel itself can remain substantially constant and, of course, its cross-sectional diameter can remain constant. At the same time, because the filter assemblies remain out of direct contact with the vessel, except possibly for the uppermost filter assembly, incoming flue gas can readily circulate between all of the filter assemblies. Obviously, even the uppermost filter assembly 16a could be provided with its own hood and thereby out of direct contact with the containment vessel. However, even as shown, this uppermost filter assembly places no structural load on the vessel other than through tube 18. Finally, it should be quite apparent that overall apparatus 10 could be utilized for filtering particulate matter out of all types of gases and, in fact, fluids in general. The specific particulate material (which may be either solid or in the form of liquid droplets) that can be readily filtered and the size of these particles will depend upon the particular filter tubes selected.

Figure 3:
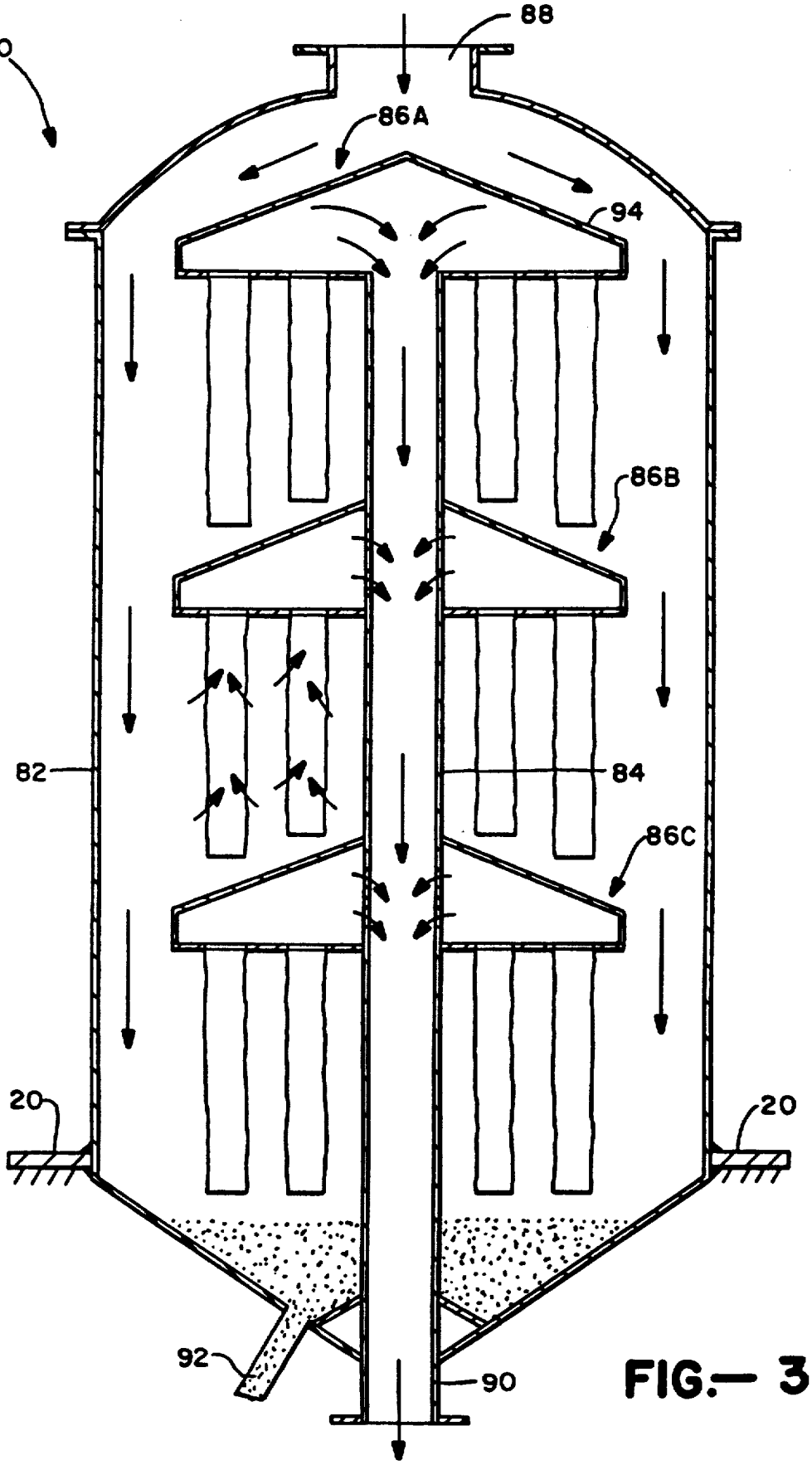
FIG. 3 is a sectional elevation of a second embodiment of the filtering apparatus in accordance with the present invention.

Having described overall filtering apparatus 10 and the way it functions, attention is now directed to FIG. 3 which illustrates a similar apparatus 80 having a similar containment vessel 82, a similar discharge tube 84 and three similar filter assemblies 86a, 86b and 86c. The primary difference between apparatus 80 and apparatus 10 is that the tube 84 is supported vertically upward from the bottom of the containment vessel rather than being suspended downward from its top end. As a result, vessel 82 includes an inlet 88 at its top end and an outlet 90 at its bottom end.

Alternatively, the gas inlet could be at position along the side of vessel 82, along with a corresponding deflector plate, exactly as previously described in apparatus 10. Also, the containment vessel does not include a dust hopper similar to hopper 38 but merely utilizes the bottom end of the containment vessel to collect dust. One or more closable chutes 92 extending down from the bottom end of the containment vessel are provided for removing this dust.

As illustrated in FIG 3, the overall vessel 82 is supported in the same manner as vessel 12, that is, by suitable support means 20. The two filter assemblies 86b and 86c may be identical to previously described assembly 16b, or assembly 86c may be provided with filter tubes of uniform lengths. The filter assembly 86a could be identical to assembly 16c to the extent that it utilizes its support plate to close the top end of the tube 84. However, its hood 94 is different than any of the other hoods in that it does not have to accommodate tube 84. Of course the other difference between apparatus 80 and apparatus 10 is that the tube 84 is placed in compression at its support joint, whereas the tube 18 is placed in tension at its support joint. Otherwise, the various features and modifications associated with apparatus 10 are equally applicable to apparatus 80.

What is claimed is:

1. An apparatus especially suitable for filtering out particulate material of a predetermined minimum size from carrier fluid [such as flue gases produced by combustion or other such processes,] said apparatus comprising:

(a) a main vessel defining an interior compartment and having inlet means through which a particulate laden carrier fluid can pass in order to enter said compartment and separate outlet means through which said carrier fluid, once filtered, can pass in order to leave said compartment;

(b) a single vertically extending outlet pipe disposed within said compartment in a specific position out of the way of said inlet means so as not to prevent said particulate laden fluid from passing into said compartment through the inlet means and cooperating with said outlet means so that the entering fluid, once filtered, must first pass into the pipe before it can leave the vessel compartment through said outlet means, said pipe including a plurality of vertically spaced-apart *inlet defining pipe* sections along its length having their own inlet means into the pipe for the passage therein of fluid, once the latter has been filtered;

(c) means for supporting said pipe in said specific position within said compartment;

(d) a plurality of vertically spaced filter assemblies, equal in number to said inlet defining pipe sections, connected with and supported substantially solely by said single outlet pipe at spaced-apart locations along [the latter adjacent respective ones of] said pipe [sections but otherwise unconnected with one another], each of said assemblies cooperating with its adjacent inlet defining pipe section for allowing particulate laden fluid within said compartment to enter said pipe through the inlets in said adjacent pipe section while filtering out particulate material of said predetermined minimum size, whereby particulate laden fluid entering the vessels leaves it in a filtered condition.

2. An apparatus according to claim 1 wherein said vessel includes a top end, an opposite bottom end and a circumferential side extending therebetween and wherein said outlet pipe extends substantially vertically within said compartment from one of said top and bottom ends.

3. An apparatus according to claim 2 wherein said vessel outlet means is located at the top end of the vessel and wherein said means for supporting said pipe includes means for supporting it only at the top end of said vessel around the outlet means of the latter.

4. An apparatus according to claim 2 wherein said vessel outlet means is located at the bottom end of the vessel and wherein said means for supporting said pipe includes means for supporting it only at the bottom end of said vessel around the outlet means of the latter.

5. An apparatus according to claim 2 wherein said plurality of filtering assemblies includes at least three such assemblies including an uppermost one and a lowermost one located nearest the top and bottom ends of said outlet pipe, respectively.

6. An apparatus according to claim 5 wherein at least those filtering assemblies located between said uppermost and lowermost ones are entirely unconnected with said vessel, either directly or indirectly, except by means of said outlet pipe.

7. An apparatus according to claim 6 wherein said vessel outlet means is located at the top end of the vessel, wherein said means for supporting said outlet pipe includes means for supporting it only at said top end around said vessel outlet means, wherein said lowermost filtering assembly is entirely unconnected with said vessel, either directly or indirectly, except by means of said outlet pipe, wherein said uppermost filtering assembly is entirely unconnected with the circumferential side of said vessel, and wherein the inlet means into said vessel is located in the circumferential side of the vessel, whereby any particulate laden fluid entering the vessel's compartment through its inlet means is able to reach all of the filtering assemblies therein.

8. An apparatus according to claim 6 wherein said vessel outlet means is located at the bottom end of the vessel, wherein said means for supporting said outlet pipe includes means for supporting it only at its bottom end around said vessel outlet means, wherein said uppermost and lowermost filtering assemblies are unconnected with said vessel, either directly of indirectly, except by means of said outlet pipe, whereby any particulate laden fluid entering the vessel's compartment through its inlet means is able to reach all of the filtering assemblies therein.

9. An apparatus according to claim 2 wherein each of said filter assemblies includes means defining a chamber around its adjacent inlet defining pipe section, plate means forming part of said chamber defining means and including through-holes serving as the only openings into said chamber from said vessel compartment, and means cooperating with all of said through-holes for allowing particulate laden fluid within said compartment to pass into said chamber through said through-holes while filtering out said particulate material, whereby the filtered fluid thereafter passes into said outlet pipe and ultimately out of said vessel.

10. An apparatus according to claim 9 wherein the filtering means of each of said filter assemblies includes a plurality of filter tubes, equal in number to said through-holes in the assembly's plate means, each of said filter tubes cooperating with an associated one of the through-holes and being designed such that particulate laden fluid within said vessel compartment must pass through the filter tube before reaching its associated through-hole.

11. An apparatus according to claim 10 wherein each of said plate means extends horizontally and wherein each of said filter tubes forming part of each of said assemblies is connected to the underside of that assembly's plate means around its associated through-hole and depends vertically downward therefrom.

[12. An apparatus especially suitable for filtering out particulate material of a predetermined minimum size from carrier fluid such as flue gases produced by combustion or other such processes, said apparatus comprising:

(a) a main vessel defining an interior compartment and having inlet means through which a particulate laden carrier fluid can pass in order to enter said compartment and separate outlet means through which said carrier fluid, once filtered, can pass in order to leave said compartment;

(b) an outlet pipe disposed within said compartment in a specific position out of the way of said inlet means so as not to prevent said particulate laden fluid from passing into said compartment through the inlet means and cooperating with said outlet means so that the entering fluid, once filtered, must fist pass into the pipe before it can leave the vessel compartment through said outlet means, said pipe including a plurality of spaced-apart sections along its length having their own inlet means into the pipe for the passage therein of fluid, once the latter has been filtered;

(c) means for supporting said pipe in said specific position within said compartment;

(d) a plurality of filter assemblies, equal in number to said inlet defining pipe sections, connected with and supported substantially solely by said pipe at spaced-apart locations along the latter adjacent respective ones of said pipe sections, each of said assemblies cooperating with its adjacent inlet defining pipe section for allowing particulate laden fluid within said compartment to enter said pipe through the inlets in said adjacent pipe section while filtering out particular material of said predetermined minimum size, whereby particulate laden fluid entering the vessels leaves it in a filtered condition, said chamber defining means forming part of each of said filter assemblies below the uppermost one on said outlet pipe including its own hood separate from said vessel disposed above its plate means.]

13. An apparatus according to claim [12] *24* wherein said plurality of filtering assemblies includes at least two such assemblies including an uppermost one and a lowermost one located nearest the top and bottom ends of said outlet pipe.

14. An apparatus according to claim 13 wherein the chamber defining means forming part of the uppermost one of said assemblies also includes a hood identical to the hoods forming parts of the other assemblies.

15. An apparatus according to claim 13 wherein the chamber defining means forming part of the uppermost one of said filter assemblies includes the top end of said vessel, its plate means and means for connecting its top and plate means together in sealing engagement.

16. An apparatus according to claim 13 including means for periodically cleaning the filter tubes of each assembly, while in place within said vessel compartment by loosening at least some particulate material accumulated on the filters, thereby causing said loosened material to fall to the bottom of said compartment.

17. An apparatus according to claim 16 wherein said cleaning means includes means for directing periodic streams of pressurized fluid through said filter tubes from the chamber sides of their associated throughholes whereby to loosen said accumulated particulate material.

18. An apparatus according to claim 16 wherein each of said hoods tapers downward from said outlet pipe whereby to more readily shed particulate material accumulating thereon.

19. An apparatus according to claim 18 wherein each of said filter assemblies including a hood also includes means for vibrating its hood to further facilitate shedding of particulate material accumulated thereon.

20. An apparatus especially suitable for filtering out particulate material of a predetermined minimum size from a carrier fluid [such as fluid gases produced by combustion or other such processes], said apparatus comprising:

(a) a main vessel defining an interior compartment having inlet means through which a particulate laden carrier fluid can pass in order to enter said compartment and separate outlet means through which said carrier fluid, once filtered, can pass in order to leave said compartment;

(b) a plurality of separate filter assemblies disposed within said vessel compartment and designed to filter out particulate material of said predetermined minimum size from particulate laden fluid entering said compartment from the vessel's inlet means; and (c) a single vertically extending tubular member for supporting said filter assemblies within said compartment in vertically spaced apart relationship to one another and in spaced apart relationship to the vessel itself, said tubular member being the sole means for supporting said assemblies within said vessel compartment and also cooperating with said assemblies and the vessel outlet means so as to serve as a discharge pipe for directing any fluid filtered by said assemblies out of said compartment through said outlet means.

21. An apparatus according to claim 20 wherein said plurality of filter assemblies include at least three such assemblies and wherein none of these assemblies engage, either directly or indirectly, said main vessel, except by means of said tubular [means] *member.*

22. An apparatus according to claim 20 wherein said vessel includes a top end, an opposite bottom end and a circumferential side extending therebetween, and wherein said tubular [means] *member* extends down from the top end of said vessel and stops short of its bottom end.

23. An apparatus according to claim 20 wherein said tubular means extends up from the bottom end of said vessel and stops short of its top end.

*24. An apparatus especially suitable for filtering out particulate material of a predetermined minimum size from carrier fluid, said apparatus comprising:*

*(a) a main vessel defining an interior compartment and having inlet means through which a particular laden carrier fluid can pass in order to enter said compartment and separate outlet means through which said carrier fluid, once filtered, can pass in order to leave said compartment*

*(i) said vessel including a top end, an opposite bottom end and a circumferential side extending therebetween and wherein said outlet pipe extends substantially vertically within said compartment;*

*(b) an outlet pipe disposed within said compartment in a specific position out of the way of said inlet means so as not to prevent said particulate laden fluid from passing into said compartment through the inlet means and cooperating with said outlet means so that the entering fluid, once filtered, must first pass into the pipe before it can leave the vessel compartment through said outlet means, said pipe including a plurality of spaced-apart inlet defining pipe sections along its length having their own inlet means into the pipe for the passage therein of fluid, once the latter has been filtered;*

*(c) means for supporting said pipe in said specific position within said compartment;*

*(d) a plurality of filter assemblies, equal in number to said inlet defining pipe sections, connected with and supported substantially solely by said pipe at spaced-apart locations along said pipe, each of said assemblies cooperating with its adjacent inlet defining pipe section for allowing particulate laden fluid within said compartment to enter said pipe through the inlets in said adjacent pipe section while filtering out particulate material of said predetermined minimum size, whereby particulate laden fluid entering the vessels leaves it in a filtered condition;*

*(i) each of said filter assemblies including means defining a chamber around its adjacent inlet defin-*

*ing pipe section, plate means forming part of said chamber defining means and including through-holes serving as the only openings into said chamber from said vessel compartment, and means cooperating with all of said through-holes for allowing particulate laden fluid within said compartment to pass into said chamber through said through-holes while filtering out said particulate material, whereby the filtered fluid thereafter passes into said outlet pipe and ultimately out of said vessel;*

*(ii) each of said filtering means of each of said filter assemblies including a plurality of filter tubes, equal in number to said through-holes in the assembly's plate means, each of said filter tubes cooperating with an associated one of the through-holes and being designed such that particulate laden fluid within said vessel compartment must pass through the filter tube before reaching its associated through-hole;*

*(iii) each of said plate means extending horizontally and wherein each of said filter tubes forming part of each of said assemblies is connected to the underside of that assembly's plate means around its associated through-hole and depends vertically downward therefrom;*

*(iv) said chamber defining means forming part of each of said filter assemblies below the uppermost one of said outlet pipe includes its own hood separate from said vessel disposed above its plate means.*

* * * * *